May 5, 1959 W. K. LIND 2,885,657

STORAGE SHIFTING APPARATUS

Filed Jan. 11, 1957 4 Sheets-Sheet 1

INVENTOR.
WARREN K. LIND

BY John P. Doritz [signature]

ATTORNEY

May 5, 1959 W. K. LIND 2,885,657

STORAGE SHIFTING APPARATUS

Filed Jan. 11, 1957 4 Sheets-Sheet 2

May 5, 1959 W. K. LIND 2,885,657

STORAGE SHIFTING APPARATUS

Filed Jan. 11, 1957 4 Sheets-Sheet 3

2,885,657

STORAGE SHIFTING APPARATUS

Warren K. Lind, Los Gatos, Calif., assignor to International Business Machines Corporation, New York, N.Y., a corporation of New York Application January 11, 1957, Serial No. 633,753

9 Claims. (Cl. 340—173)

Figure 1:
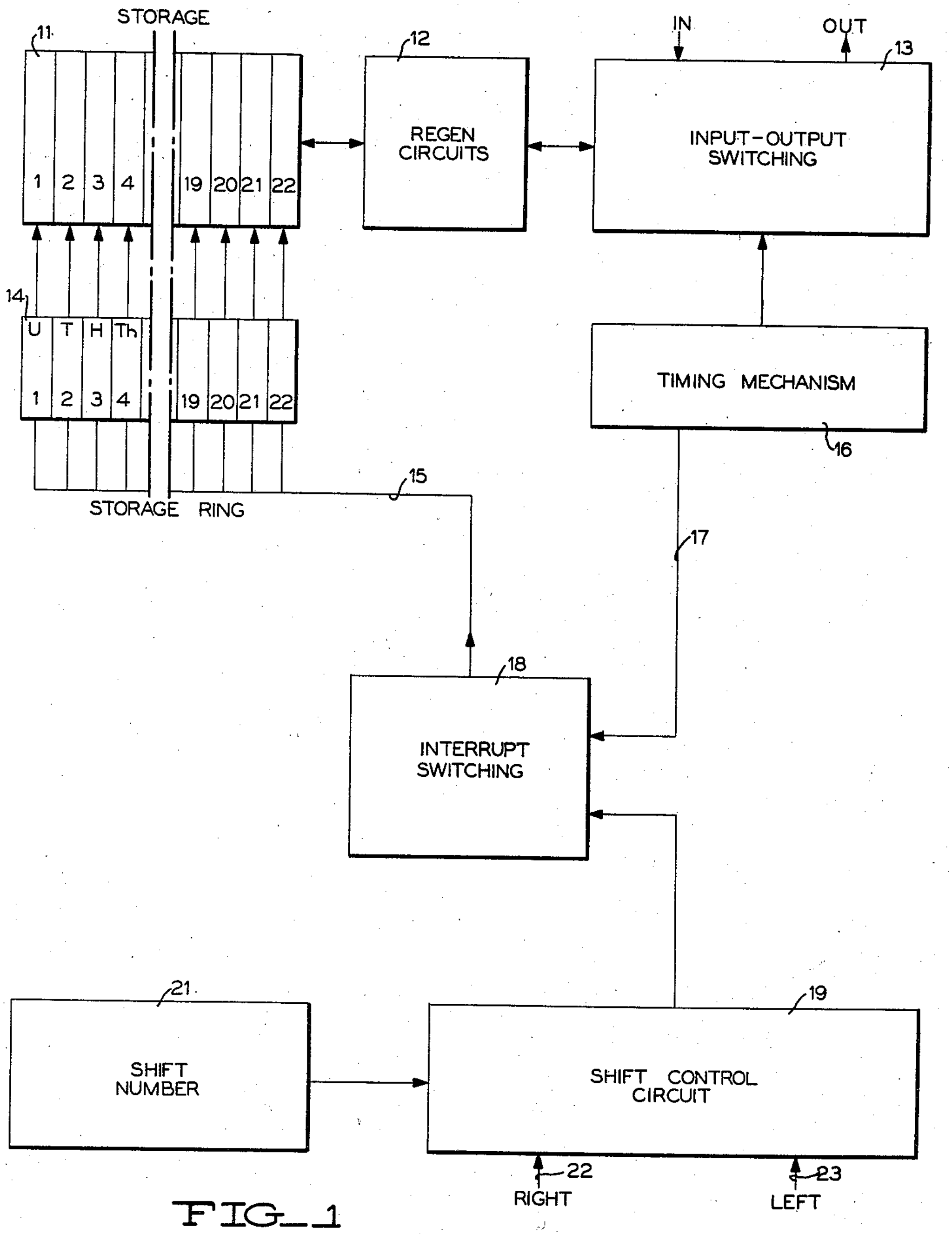

This invention relates to data storage devices and more particularly to shift mechanism for such devices, It is an object of this invention to provide multi-ordered storage apparatus with improved shift mechanism.

In serial readout from static data storage apparatus the significance of a digit, e.g., units, tens, etc., is determined by the time at which readout occurs with relation to a timing or clocking device. The timing device is usually the synchronizing means for the machine in which the storage device is used.

According to the present invention, a static data storage device is provided with a ring, which ring is sequentially advanced to sequentially write into or read out of successive positions of the storage device. The timing or clocking mechanism of the machine in which the storage device is used supplies pulses to advance the storage ring. A switch is provided between the timing mechanism and the storage ring whereby the driving pulses to the storage ring may be interrupted. The switch is under control of a shift number representing the required number of positions to be shifted. Depending on whether the shift is to be left (toward the higher ordered positions) or right (toward the lower ordered positions) a number of pulses equal to the shift number or the complement of this number are prevented from reaching the storage ring. Thus, a shift is effected by changing the relationship between the storage ring and the timing mechanism.

Accordingly, an object of this invention is to provide improved means for changing the relationship between a storage ring and a timing mechanism.

Another object is to provide improved means for effecting a shift of data in a storage device.

Another object is to provide improved means for effecting a shift in a storage device directly under control of a shift number.

Still another object is to provide improved means under control of a number representation for changing the relationship between timing mechanism and a storage ring.

Another object is to provide shift mechanism of improved efficiency.

Another object is to provide shift mechanism of improved speed of operation.

A still further object is to provide improved shift mechanism capable of shifting either right or left under control of a shift number.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a block diagram of storage apparatus embodying the present invention.

Figure 2A:
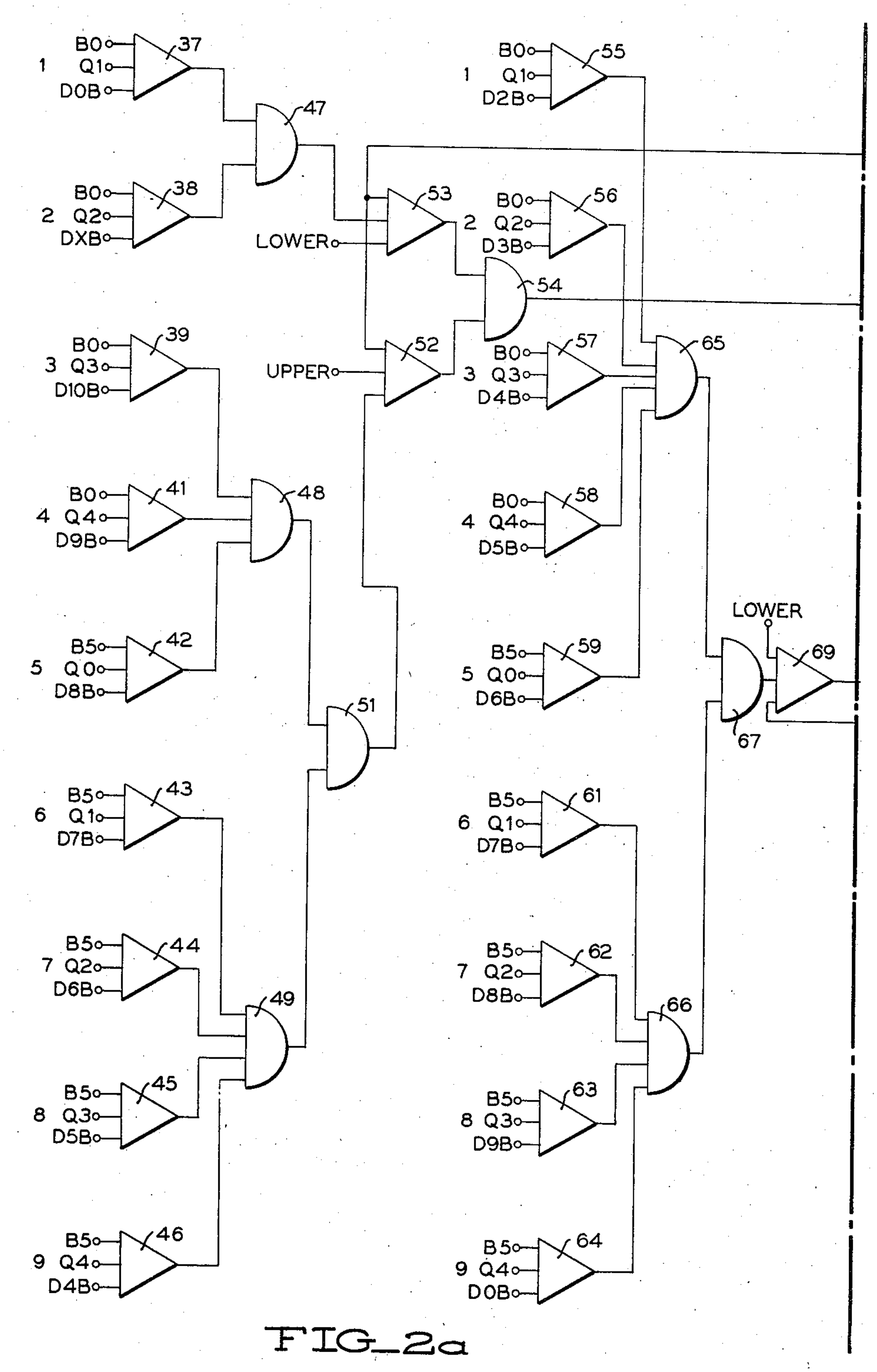
Figure 2B:
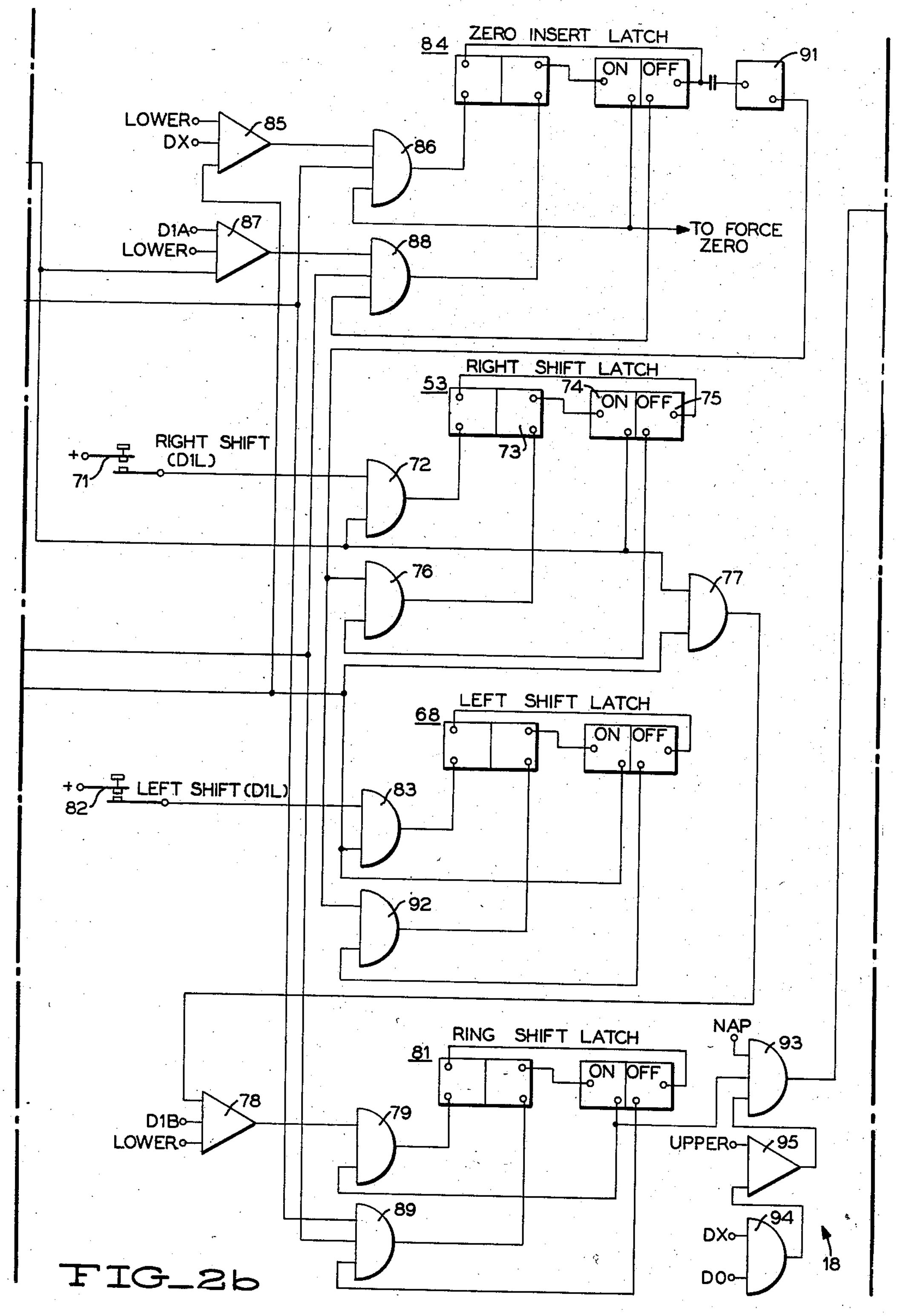
Figure 2C:
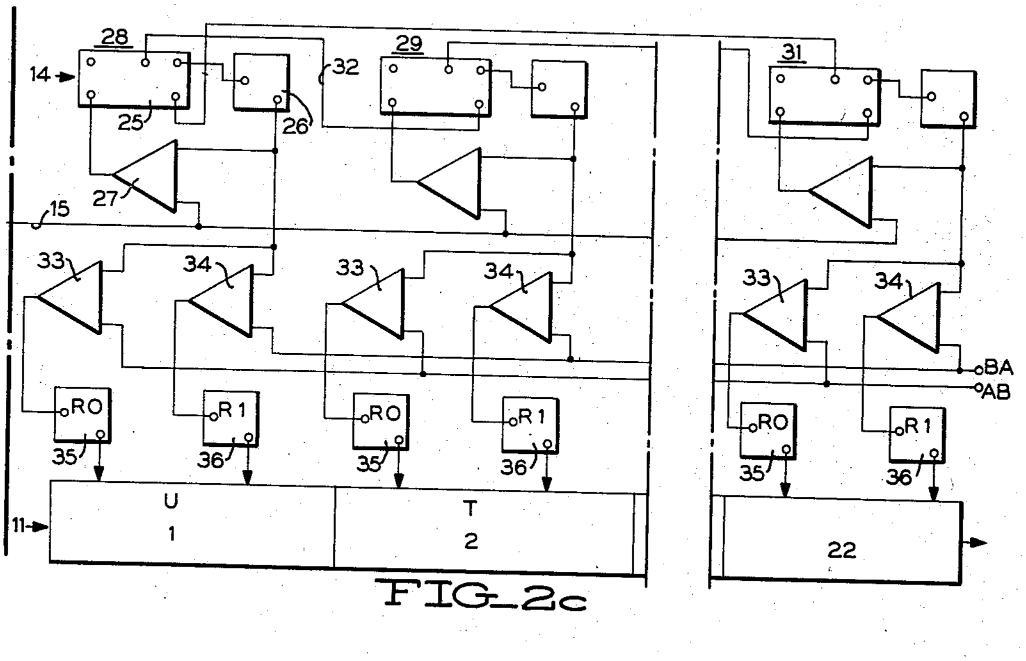

Figs. 2*a* through 2*c* are more detailed block diagrams of a portion of Fig. 1 embodying the present invention.

Figure 3:
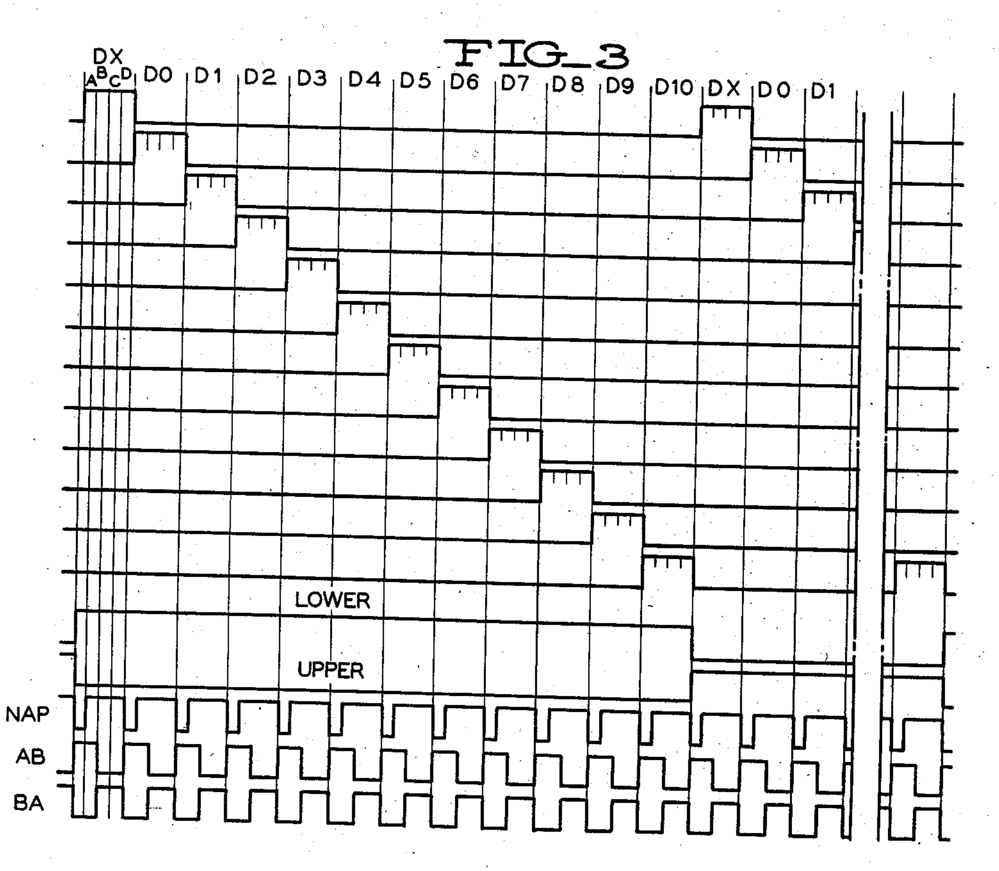

Fig. 3 is a showing of a number of timing pulse wave forms to a common time base supplied by the timing mechanism of Fig. 1.

Referring to Fig. 1, there is shown a storage register 11 and the associated shifting mechanism of the present invention. Storage register 11 may, for example, be identical to the condenser storage register described and shown as the accumulator in the F. E. Hamilton et al. application, Serial No. 544,520, filed November 2, 1955, and assigned to the present assignee. Briefly, this storage register is comprised of a matrix of condenser storage elements which store data in the biquinary code representation. Data is entered into or read from this register serially-by-digit and parallel-by-bit. Regeneration of the information is provided by regeneration circuits 12, Fig. 2*c*, and the input and output of the register is controlled by input-output switching 13. The regeneration circuits and the input-output switching may be as shown and described in the above-identified Hamilton et al. application. This circuits provide means for regenerating the data in register 11, means for writing new information in the register and means for reading the information out of the register. For a clearer showing of the present invention, the details of the above circuits are omitted herein.

A storage ring 14 is provided for sequentially driving register 11 to read information out of or write information into register 11. Ring 14 is driven by pulses appearing on line 15.

A main timing or clocking mechanism 16 is provided for producing the various timing pulses shown in Fig. 3. Timing mechanism 16 may be comprised of a latch type ring driven by signals from spots recorded on a rotating magnetic drum. The details of such a timing mechanism are shown in the above-identified Hamilton et al. application. This Hamilton et al. application shows the detailed means by which the various pulses of Fig. 3 may be derived.

Timing mechanism 16 supplies timing pulses for controlling the input-output switching 13 and also supplies a series of timing pulses over line 17 to switch 18. Interrupt switch 18 is shown is greater detail in Figs. 2*a* and 2*b*.

In general, shift control circuit 19 controls switch 18 to prevent a number of pulses equal to the number of positions to be shifted or the complement of this number of pulses from reaching storage ring 14.

The shift number storage device 21 is provided for manifesting a shift number, e.g., for manifesting a number indicating the required number of positions to be shifted. Storage device 21 may store a number represented in the biquinary code. With a maximum of nine positions of shift, storage device 21 need store but a single digit. In the biquinary code, only seven bistable devices are thus required. A single position of the address register of the above-identified Hamilton et al. application is an example of a suitable such storage device. A digit is here represented by signals on two of seven parallel lines. A digit manifested by storage device 21 controls circuit 19 to enable a shift of the required number of positions. The right and left controls of circuit 19 determine the direction of shift. That is, a signal on line 22 affects a right shift (a shift toward the lower ordered positions) and a signal on line 23 affects a left shift (a shift toward the higher ordered positions). Shift control circuit 19 is shown in greater detail in Figs. 2*a* and 2*b*.

Referring to Fig. 2*c*, the storage ring 14 is shown in a more detailed diagrammatic form. Ring 14 is a twenty-two point latch ring driven by negative A pulses (NAP Fig. 3) supplied through switch 18, Fig. 2*b*, over line 15. Each point or stage of ring 14 is comprised of a latch circuit of the type shown and described in the above-mentioned Hamilton et al. application. Each latch includes a double inverter 25 and a cathode follower 26. The double inverter 25 is so biased that the left-hand inverter is normally nonconducting and the right-hand inverter is conducting. The output from the anode of the right-hand inverter is coupled to the input of cathode follower 26. The output of cathode follower 26 is fed through a switch 27 to the input of the left-hand inverter of double inverter 25. Switch 27 may be a diode "and" circuit of the well-known type. Once the latch is turned "on," e.g., the right-hand inverter of double inverter 25 is cut off, this condition will persist so long as line 15 remains positive. If it is assumed that latch 28 is initially "on," then the first negative going pulse on line 15 will turn latch 28 "off" by breaking the coincidence at switch 27. As latch 28 goes "off," a capacitive coupled negative going pulse is taken from the anode of the right-hand inverter of double inverter 25 over line 32 to the input of the right-hand inverter of latch 29. This negative going pulse turns latch 29 "on" and latch 29 remains "on" as explained above until the next succeeding negative going pulse appears on line 15. Ring 14 advances in this manner each time a negative going pulse is applied over line 15. The last stage of ring 14 is coupled back to the first stage for continued cyclic operation. For a more detailed showing and description of a ring circuit of this type, reference is made to the digit ring of the above-mentioned Hamilton et al. application.

The output from each stage of ring 14 is taken from the cathode follower and switched at a switch 33 with an AB gate (Fig. 3) and at a switch 34 with a BA gate. The output of switch 33 drives a read out cathode follower 35, and the output of switch 34 drives a read in cathode follower 36. When a cathode follower 35 is energized, the corresponding position of storage register 11 is driven to read out. In a like manner, when a cathode follower 36 is energized, the corresponding position of storage register 11 is driven to read in.

The shift control circuit is shown in more detail at Figs. 2*a* and 2*b*. The seven wire output of the shift number storage device 21 of Fig. 1 is taken to the switch and mix circuits shown in Fig. 2*a*. The B0 and Q1 lines, representing a 1, are switched with a D0B pulse at switch 37. Each digit pulse is divided into four portions; namely, the A portion representing the first one fourth of the pulse, the B portion representing the second one fourth, the C portion representing the third one fourth, and the D portion representing the last one fourth as shown in Fig. 3. Switch 37 may be of the well-known diode "and" circuit type. The B0 and Q2 lines are switched with a DXB pulse at switch 38. The B0 and Q3 lines representing a 3 are switched with a D10B pulse at switch 39, the B0 Q4 lines representing a 4 are switched with a D9B pulse at switch 41, the B5 Q0 lines representing a 5 are switched with a D8B pulse at switch 42, and in like manner, the B5 Q1 lines with a D7B pulse at switch 43, the B5 Q2 lines with a D6B pulse at switch 44, the B5 Q3 lines with a D5B pulse at switch 45 and the B5 Q4 lines with a D4B pulse at switch 46. The outputs of switches 37 and 38 are mixed at mix 47. Mix 47 may be of the well-known diode "or" type circuit. The outputs of switches 39, 41 and 42 are mixed at mix 48 and the outputs of switches 43, 44, 45 and 46 are mixed at mix 49. The outputs of mixes 48 and 49 are mixed at mix 51. The various amplifiers required in the present circuit have been omitted in order to avoid confusing the present invention. These amplifiers may be supplied as needed in any manner well known in the art.

The output of mix 51 is switched at switch 52 with an upper signal (Fig. 3), and the output of the right shift latch 53 (Fig. 2*b*). The output of mix 47 is switched at switch 53 with the lower signal (Fig. 3), and the output of the right shift latch and the outputs of switches 52 and 53 are mixed at mix 54. If, for example, a right shift is called for and the shift number is 7, an output from mix 54 will occur at D6B upper time.

The above-mentioned seven wires from the shift number storage device 21 are also selectively switched as follows: The B0 Q1 lines at switch 55 with a D2B pulse, the B0 Q2 lines with a D3B pulse at switch 56, the B0 Q3 lines with a D4B pulse at switch 57, the B0 Q4 lines with a D5B pulse at switch 58, the B5 Q0 lines with a D6B pulse at switch 59, the B5 Q1 lines with a D7B pulse at switch 61, the B5 Q2 lines with a D8B pulse at switch 62, the B5 Q3 lines with a D9B pulse at switch 63, and the D5 Q4 lines with a D10B pulse at switch 64. The outputs of switches 55 through 59 are mixed at mix 65. The outputs of switches 61 through 64 are mixed at mix 66. The outputs of mixes 65 and 66 are mixed at mix 67. The output of mix 67 is switched with the lower signal and the output from the left shift latch 68 (Fig. 2*b*) at switch 69. If, for example, a left shift is required and the shift number is 5, then an output from switch 69 will occur at D6B lower time.

If a right shift is called for, switch 71 (Fig. 2*b*) is closed at D1 lower time which sends a positive signal through mix 72 to turn latch 53 "on." Latch 53 is comprised of a double inverter 73 and a pair of cathode followers 74 and 75. The operation of latch 53 is such that a positive going signal applied to the input of the left-hand inverter of double inverter 73 turns the latch "on," and when turned "on," is held "on" by the output of cathode follower 74 fed back through mix 72. Latch 53 is turned "off" by the application of a positive going signal to the input of the right-hand inverter of double inverter 73. When "off," latch 53 is held "off" by the output of cathode follower 75 fed back to the input of the right-hand inverter of the double inverter 73 through mix 76. A more detailed explanation of the operation of such latch circuits may be found in the above-mentioned Hamilton et al. application.

When latch 53 is turned "on," the cathode follower 74 will supply a positive going output to mix 77 until latch 53 is turned "off." The output of cathode follower 74 is thus fed through mix 77 to switch 78 where it is switched with a D1B pulse and the lower signal. When a right shift is called for there will be coincidence at switch 78 at D1B lower time, and an output from switch 78 will be fed through mix 79 to the input of ring shift latch 81 to turn latch 81 "on."

If a left shift is required, switch 82 will be closed at D1 lower time to send a positive signal through mix 83 to turn left shift latch 68 "on." The "on" output of latch 68 is fed through mix 77 to switch 78. Thus, if a left shift is required, coincidence at switch 78 at D1B lower time will produce an output from switch 78 to be fed through mix 79 to turn latch 81 "on."

When drive pulses are withheld from ring 14, the ring remains at one stage and the output from the corresponding stage of storage will appear repeatedly as the output from storage register 11. In order to prevent this erroneous information from being utilized by the data processing machine of which the present invention is a part, a signal must be produced while ring 14 is not being advanced to cause zeros to be substituted for the information repeatedly read from the particular one position of register 11. For this purpose, zero insert latch 84 is provided. The output of zero insert latch 84 may be used as desired to effect this objective. If the device of the present invention is used with the machine of the above-identified Hamilton et al. application, then the output of zero insert latch 84 would be used to force zeros into the output of the adder of the Hamilton et al. application as explained in that application. The "on" output of left shift latch 68 is also fed to switch 85 where it is switched with the lower signal and a DX pulse. Since, when a left shift is required, left shift latch 68 is turned "on" at D1 lower time and remains on until turned off, coincidence will occur at switch 85 at the next succeeding DX lower time. With coincidence at switch 85, an output signal is fed from switch 85 through mix 86 to turn zero insert latch 84 "on." The output from mix 54 (Fig. 2*a*) is also fed through mix 86 to latch 84. A signal from mix 54 will thus turn zero insert latch 84 "on" at a time depending on the value of the shift number. For example, a shift number of 7 and a right shift signal will cause latch 84 to be turned "on" at D6B upper time. If a right shift is called for, the "on" output of right shift latch 53 is switched with a D1A pulse and the lower signal at switch 87, to produce coincidence at switch 87 at the next succeeding D1A time after right shift latch 53 is turned "on." Coincidence at switch 87 produces an output signal from switch 87 which is fed through mix 88 to turn latch 84 "off."

If a left shift is called for, a signal will be produced at the output of switch 69 (Fig. 2*a*) at a time determined by the shift number. For example, if a left shift of 5 is required, then an output will appear at switch 69 at D6B lower time and this signal from switch 69 will be fed through mix 88 to turn latch 84 "off."

The output of switch 69 (Fig. 2*a*) is also fed through mix 89 at Fig. 2*b* to turn ring shift latch 81 "off." The anode of the left-hand inverter of latch 84 is capacitively coupled to a cathode follower 91 such that when latch 84 is turned "off," the positive going edge of the output signal from the anode of the left-hand inverter of latch 84 causes cathode follower 91 to conduct momentarily to send a positive going signal through mixes 76 and 92 to turn either latch 53 or latch 68 "off" depending on which was on.

The output of mix 54 (Fig. 2*a*) is also fed through mix 89 to turn ring shift latch 81 "off." If, for example, a right shift of 7 is required, then ring shift latch 81 is turned "off" at D6B upper time by the signal from mix 54 through mix 89.

Negative A pulses (NAP Fig. 3) are continuously fed to mix 93. From the characteristics of a positive pulse mix circuit, it will be recalled that an output is available when any one of the inputs is in a positive condition. Thus, line 15 will be at a positive level when any one of the inputs to mix 93 is at a positive level. In order for the required negative going pulses to appear on line 15 to drive ring 14, it is necessary that all the inputs to mix 93 be at their negative levels. Thus, mix 93 acts as a switch for the negative going A pulses; that is, a negative A pulse will go through mix 93 only when the remaining inputs are at their negative level. To block the passage of negative A pulses through the mix 93, it is only necessary that one of the inputs to mix 93 be at the positive level. A DX pulse and a D0 pulse are mixed at mix 94 and switched at switch 95 with the upper signal to produce a positive going output from switch 95 at DX and D0 upper time. Thus, during DX and D0 upper time, the negative A pulses are blocked at mix 93 to allow only twenty-two negative A pulses to pass through switch 18 during any one cycle. Since the "on" output of ring shift latch 81 is also fed to mix 93, the negative A pulses will be blocked at mix 93 during the time that ring shift latch 81 is in the "on" condition.

From the above description it is seen that for a right shift, ring shift latch 81 is turned "on" at D1B lower time and is turned "off" at a time determined by the shift number. For the example of 7 as the shift number, ring shift latch 81 is turned "off" at D6B upper time. Thus, 15 negative A pulses are blocked at mix 93. It is to be noted that 15 is the 22's complement of 7.

For a left shift, ring shift latch 81 is turned "on" at D1B lower time and is turned "off" by an output from switch 69 (Fig. 2*a*). For a left shift of 5 for example, an output from switch 69 to turn ring shift latch 81 "off" is produced at D6B lower time. Thus, 5 negative A pulses are blocked at mix 93.

Since the storage ring is a twenty-two point ring, it is seen that for a left shift the number of pulses withheld from the ring is equal to the shift number, and for a right shift the number of pulses withheld is the 22's complement of the shift number. Thus, the phase of the storage ring 14 is changed in accordance with the shift number with respect to the timing mechanism 16. Since the timing mechanism 16 dictates the significance of a value read from storage register 11, changing the phase between ring 14 and timing mechanism 16 is effective to produce the desired shift. It is noted that this shift is effected in a single cycle and with a minimum of equipment.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Shift control apparatus comprising primary timing means for producing timing signals, a cyclically operable ring adapted to be driven by timing signals from said primary timing means, means including a switch for transmitting timing signals from said primary timing means to said ring, means manifesting a shift number, and means responsive to said shift number manifestation for selectively activating said switch.

2. Data storage apparatus comprising a multiposition data storage register, a cyclically operable ring adapted to be advanced by timing signals, means under control of said ring for sequentially activating successive positions of said register to read data therefrom, timing means for producing timing signals, switching means for transmitting timing signals from said timing means to said ring, and means responsive to a number manifestation for controlling said switching means to selectively interrupt the transmission of timing signals from said timing means to said ring whereby the phase relationship between said ring and said timing means is altered in accordance with a manifested number.

3. Data storage apparatus comprising a multiposition data storage register, a ring circuit having a plurality of stages and adapted to be advanced through said plurality of stages by timing signals, means under control of said ring for sequentially activating successive positions of said register, timing means for producing a succession of timing signals, means for manifesting a shift number, and means under control of said shift number manifestation and said timing means for selectively transmitting timing signals from said timing means to said ring.

4. Data storage apparatus comprising a multiposition data storage register, a ring having a plurality of stages and adapted to be advanced through said plurality of stages by timing signals, means under control of said ring for activating successive positions of said register, timing means for producing a succession of timing signals, a signal transmitting link for transmitting timing signals from said timing means to said ring, means for manifesting a shift signal, and means under control of said shift signal manifesting means for disabling said signal transmitting link.

5. Data storage apparatus comprising a multi-position data storage register, timing means for producing a succession of timing signals, a ring having a plurality of stages and adapted to be advanced through said plurality of stages by timing signals from said timing means, means under control of said ring for activating successive positions of said register, a signal transmitting link for transmitting timing signals from said timing means to said ring, means for manifesting a shift signal, means under control of said shift signal manifesting means for disabling said signal transmitting link, means for manifesting a shift number, and means responsive to said shift number manifesting means and said timing means for enabling said link whereby a number of timing signals are withheld from said ring.

6. Shift control apparatus comprising first timing means, second timing means including a ring having a plurality of stages and adapted to be driven by said first timing means, means manifesting a shift number, and means under control of said shift number manifestation for selectively connecting said first and said second timing means.

7. Apparatus according to claim 6 wherein said first timing means includes a second ring having a plurality of stages and means for producing a succession of timing signals.

8. Apparatus according to claim 7 wherein said connecting means is jointly responsive to said second ring.

9. Apparatus according to claim 5 wherein said timing means includes a second ring having a plurality of stages and means for producing a succession of timing signals and said enabling means is jointly responsive to said second ring.

References Cited in the file of this patent

UNITED STATES PATENTS 2,758,787 Felker ---------------- Aug. 14, 1956